United States Patent
Fujisaki et al.

(10) Patent No.: US 10,259,325 B2
(45) Date of Patent: Apr. 16, 2019

(54) IMAGE DISPLAY DEVICE

(71) Applicant: Toyota Jidosha Kabushiki Kaisha, Toyota-shi, Aichi-ken (JP)

(72) Inventors: Satoshi Fujisaki, Nagoya (JP); Takumi Kochiya, Nisshin (JP); Kohji Usui, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/864,533

(22) Filed: Jan. 8, 2018

(65) Prior Publication Data

US 2018/0222319 A1   Aug. 9, 2018

(30) Foreign Application Priority Data

Feb. 8, 2017   (JP) .................. 2017-021266

(51) Int. Cl.
| | |
|---|---|
| *H04N 7/18* | (2006.01) |
| *B60K 35/00* | (2006.01) |
| *G06T 7/70* | (2017.01) |
| *G06T 11/60* | (2006.01) |
| *B60R 1/00* | (2006.01) |

(Continued)

(52) U.S. Cl.
CPC ............... *B60K 35/00* (2013.01); *B60R 1/00* (2013.01); *G06T 7/50* (2017.01); *G06T 7/70* (2017.01); *G06T 11/60* (2013.01); *B60K 2350/2013* (2013.01); *B60R 2001/1215* (2013.01); *B60R 2300/30* (2013.01); *B60R 2300/306* (2013.01); *B60R 2300/8066* (2013.01); *G06T 2207/30252* (2013.01)

(58) Field of Classification Search
CPC .......... H04N 7/181; H04N 7/18; H04N 7/183; B60K 35/00; B60K 2350/2013; G06T 7/50; G06T 7/70; G06T 11/60; G06T 2207/30252; B60R 1/00; B60R 2001/1215; B60R 2300/30; B60R 2300/306; B60R 2300/8066
USPC .................. 348/148, 143, 149; 340/907, 937
See application file for complete search history.

(56) References Cited

U.S. PATENT DOCUMENTS

| | | | |
|---|---|---|---|
| 2012/0140074 A1 | 6/2012 | Taguchi et al. | |
| 2013/0229523 A1* | 9/2013 | Higgins-Luthman | B60Q 1/1423 |
| | | | 348/148 |
| 2014/0333770 A1* | 11/2014 | Baur | B60R 1/00 |
| | | | 348/148 |

FOREIGN PATENT DOCUMENTS

JP   2012-116357 A   6/2012

* cited by examiner

*Primary Examiner* — Sherrie Hsia
(74) *Attorney, Agent, or Firm* — Dinsmore & Shohl LLP

(57) ABSTRACT

The image display device includes a distance obtainer configured to obtain a vehicle-to-vehicle distance between a vehicle and a following vehicle. A controller is configured to: determine a magnitude of an image-cutout angle value based on the obtained vehicle-to-vehicle distance, such that a display state of a rear-view display unit is to be switched from a mirror-surface showing state to a display showing state such that a size of the following vehicle in the mirror-surface showing state is identical to a size of the following vehicle to be displayed in the display showing state; control a display to display a display image created from a cutout image that is cut out in the determined image-cutout angle value; and adjust the image-cutout angle value so as to gradually decrease a size of the following vehicle displayed on the display when the obtained vehicle-to-vehicle distance is greater than a set value.

9 Claims, 8 Drawing Sheets

(51) Int. Cl.
*G06T 7/50* (2017.01)
*B60R 1/12* (2006.01)

IMAGE DISPLAY DEVICE

CROSS REFERENCE TO RELATED APPLICATION

The present application claims priority from Japanese Patent Application No. 2017-021266, which was filed on Feb. 8, 2017, the disclosure of which is herein incorporated by reference in its entirety.

BACKGROUND

The following disclosure relates to an image display device including a display mounted in a passenger compartment and configured to control the display to display an image taken by a camera and representing a view behind a vehicle.

There is known an image display device including a display mounted in a passenger compartment and configured to control the display to display an image taken by a camera and representing a view behind a vehicle. Patent Document 1 (Japanese Patent Application Publication No. 2012-116357) discloses a vehicle including an optical inner mirror and an image display device in which a half mirror is provided between a first display and a second display, and an image displayed on the first display and an image displayed on the second display are projected onto the half mirror.

SUMMARY

In the above-described image display device, the camera for taking an image to be displayed on the display is mounted at a rear of the optical inner mirror in the front and rear direction (the longitudinal direction) of the vehicle. Thus, the size of a display object displayed on the display may differ from that of the display object reflecting in the optical inner mirror, depending upon a distance between the camera and the display object located behind the vehicle. In the case where the display and the optical inner mirror of the image display device are formed integrally with each other, a view behind the vehicle is displayed on one of the display and the optical inner mirror. Thus, when the device on which the view behind the vehicle is displayed is switched between the display and the optical inner mirror, discomfort is caused in some cases by change of the size of the display object displayed on the image display device.

Accordingly, an aspect of the disclosure relates to an image display device configured to reduce discomfort at switching between a display and an optical inner mirror by reducing, at the switching, a difference between a size of a display object displayed on the display and a size of the display object that reflects in the optical inner mirror.

In one aspect of the disclosure, an image display device includes: a camera configured to take an image representing a view behind a vehicle; a rear-view display unit including (i) a mirror surface reflecting a view behind the vehicle and (ii) a display configured to display at least a portion of a rear-view image taken by the camera, wherein a display state of the rear-view display unit is switchable between a mirror-surface showing state in which the view behind the vehicle reflects in the mirror surface and a display showing state in which the view behind the vehicle is displayed on the display; and a controller configured to: cut out a cutout image from the rear-view image based on an image-cutout angle value, wherein the cutout image is a portion of the rear-view image taken by the camera, and the image-cutout angle value represents a size of the cutout image with respect to the rear-view image; create a display image based on the cutout image cut out by the controller such that the display image matches a size of a display region of the display; and display the created display image on the display. The image display device further includes a distance obtainer configured to obtain a vehicle-to-vehicle distance between the vehicle and a following vehicle that follows the vehicle. The controller is configured to: determine a magnitude of the image-cutout angle value based on the vehicle-to-vehicle distance obtained by the distance obtainer, such that the display state of the rear-view display unit is to be switched from the mirror-surface showing state to the display showing state such that a size of the following vehicle in the mirror-surface showing state is identical to a size of the following vehicle to be displayed in the display showing state; control the display to display the display image created from the cutout image that is cut out in the determined image-cutout angle value; and adjust the image-cutout angle value so as to gradually decrease a size of the following vehicle displayed on the display when the vehicle-to-vehicle distance obtained by the distance obtainer is greater than a set value.

The above-described adjustment of the image-cutout angle value reduces discomfort caused at switching of the display state of the rear-view display unit.

There will be described by way of examples forms of aspects of the disclosure. The forms are numbered like the appended claims and depend from another form or forms, where appropriate, for easy understanding. It is to be understood that the aspects of the present disclosure are not limited to those of the following forms. That is, the aspects of the present disclosure are to be construed by taking account of, e.g., the description following each form, the description of the embodiment, and conventional techniques, and as long as the aspects of the present disclosure are constructed in this way, any one of the following forms may be implemented with one or more features added, or one or more of a plurality of features included in any one of the following forms are not necessarily provided all together.

(1) An image display device, comprising:
a camera configured to take an image representing a view behind a vehicle;
a rear-view display unit comprising (i) a mirror surface reflecting a view behind the vehicle and (ii) a display configured to display at least a portion of a rear-view image taken by the camera, wherein a display state of the rear-view display unit is switchable between a mirror-surface showing state in which the view behind the vehicle reflects in the mirror surface and a display showing state in which the view behind the vehicle is displayed on the display; and
a controller configured to:
cut out a cutout image from the rear-view image based on an image-cutout angle value, wherein the cutout image is a portion of the rear-view image taken by the camera, and the image-cutout angle value represents a size of the cutout image with respect to the rear-view image;
create a display image based on the cutout image cut out by the controller such that the display image matches a size of a display region of the display; and
display the created display image on the display,
wherein the image display device further comprises a distance obtainer configured to obtain a vehicle-to-vehicle distance between the vehicle and a following vehicle that follows the vehicle, wherein the controller is configured to:
  determine a magnitude of the image-cutout angle value based on the vehicle-to-vehicle distance obtained by the distance obtainer, such that the display state of the rear-view display unit is to be switched from the mirror-surface showing state to the display showing state such that a size of the following vehicle in the mirror-surface showing state is identical to a size of the following vehicle to be displayed in the display showing state;
  control the display to display the display image created from the cutout image that is cut out in the determined image-cutout angle value; and
  adjust the image-cutout angle value so as to gradually decrease a size of the following vehicle displayed on the display when the vehicle-to-vehicle distance obtained by the distance obtainer is greater than a set value.

In the case where the camera is provided at a rear of the mirror surface, the distance between the camera and the following vehicle is less than the distance between the mirror surface and the following vehicle. Thus, some image-cutout angle values cause the size of the following vehicle displayed on the display to differ from the size of the following vehicle that is to reflect in the mirror surface, in the state in which the following vehicle is spaced apart from the vehicle at the vehicle-to-vehicle distance. In the image display device, when the display state is switched from the mirror-surface showing state to the display showing state, the controller controls the display to display the following vehicle in the same size as that of the following vehicle displayed on the mirror-surface showing state. Thus, when the display state is switched from the mirror-surface showing state to the display showing state, it is possible to reduce discomfort caused by change of the size of the following vehicle displayed on the rear-view display unit before and after the switching. When the vehicle-to-vehicle distance is greater than the set value, the image-cutout angle value is gradually adjusted such that the size of the following vehicle displayed on the display decreases, after the display state is switched from the mirror-surface showing state to the display showing state. Accordingly, there is no discomfort caused by change of the size of the following vehicle displayed on the rear-view display unit at switching of the display state. Moreover, after the image-cutout angle value is adjusted, it is possible to obtain a view broader than that at the time point when the display state is switched. Also, the gradual reduction of the size of the following vehicle displayed on the display makes it easier for an occupant to recognize the increase in angle of the display image displayed on the display.

(2) The image display device according to the above form (1),
  wherein the display is formed on the mirror surface,
  wherein the mirror surface comprises: a first mirror surface portion formed on a surface of the display; and a second mirror surface portion disposed around the first mirror surface portion, and
  wherein the rear-view display unit is switchable between (i) the mirror-surface showing state in which the view behind the vehicle reflects in the first mirror surface portion and the second mirror surface portion and (ii) the display showing state in which the view behind the vehicle is displayed on the display.

Since the first mirror surface portion is formed in the surface of the display, the rear-view display unit takes only one of the display showing state and the mirror-surface showing state. In the image display device, when the display state is switched between the display showing state and the mirror-surface showing state, the image-cutout angle value is adjusted such that the size of the following vehicle displayed in the display showing state and the size of the following vehicle displayed in the mirror-surface showing state are equal to each other. This adjustment reduces discomfort at switching of the display state.

(3) The image display device according to the above form (1) or (2), wherein the controller is configured to, when the vehicle-to-vehicle distance obtained by the distance obtainer is greater than the set value, adjust the image-cutout angle value from a first image-cutout angle value to a second image-cutout angle value greater than the first image-cutout angle value such that the size of the following vehicle displayed on the display gradually decreases, wherein the first image-cutout angle value is a value in which the size of the following vehicle in the mirror-surface showing state is identical to the size of the following vehicle displayed in the display showing state at a time point when the display state is switched from the mirror-surface showing state to the display showing state.

The size of the following vehicle displayed on the display is determined by the size of the following vehicle in the cutout image with respect to the cutout image, that is, the size of the following vehicle displayed on the display is determined by the magnitude of the image-cutout angle value which determines the size of the cutout image. That is, the size of the following vehicle in the cutout image with respect to the cutout image decreases with increase in the image-cutout angle value. Accordingly, in the image display device, the size of the following vehicle displayed on the display gradually decreases with gradual increase in the image-cutout angle value from the first image-cutout angle value to the second image-cutout angle value. As a result, after the image-cutout angle value is increased to the second image-cutout angle value, it is possible to obtain a view broader than that at the time point when the display state is switched.

(4) The image display device according to the above form (3), wherein the controller is configured to control the display to display a plurality of display images respectively corresponding to a plurality of image-cutout angle values greater than the first image-cutout angle value and less than the second image-cutout angle value, after the display image based on the first image-cutout angle value is displayed on the display and before the display image based on the second image-cutout angle value is displayed on the display.

In the image display device configured as described above, the controller adjusts the image-cutout angle value little by little from the first image-cutout angle value to the second image-cutout angle value, creates the display image based on the adjusted image-cutout angle value upon each adjustment, and displays the display image on the display. Thus, the display images corresponding to the respective image-cutout angle values greater than the first image-cutout angle value and less than the second image-cutout angle value are displayed in order from the display image corresponding to the smallest image-cutout angle value. This control gradually increases the size of the following vehicle displayed on the display. Accordingly, it is easy for the occupant to recognize the increase in the angle for the display image displayed on the display when compared with the case where the size of the following vehicle displayed on the display is instantly changed from its size established when the image-cutout angle value is the first image-cutout angle value, to its size established when the image-cutout angle value is the second image-cutout angle value.

(5) The image display device according to any one of the above forms (1) through (4), wherein the controller is configured to, when the vehicle-to-vehicle distance obtained by the distance obtainer is less than or equal to the set value, determine the image-cutout angle value such that the size of the following vehicle displayed on the display is identical to a size of the following vehicle that is spaced apart from the vehicle at the obtained vehicle-to-vehicle distance and that is to reflect in the mirror surface.

In the image display device configured as described above, a difference between the size of the following vehicle displayed on the display and the size of the following vehicle that is to reflect in the mirror surface is reduced, resulting in reduction of discomfort at switching of the display state of the rear-view display unit.

(6) The image display device according to any one of the above forms (1) through (5), wherein the controller is configured to, when the display state of the rear-view display unit is switched from the display showing state to the mirror-surface showing state and when the vehicle-to-vehicle distance obtained by the distance obtainer is greater than the set value, adjust the image-cutout angle value such that the size of the following vehicle in the display image gradually increases and such that the display state of the rear-view display unit is switched from the display showing state to the mirror-surface showing state in a state in which the size of the following vehicle displayed in the display showing state is identical to the size of the following vehicle in the mirror-surface showing state.

In the image display device configured as described above, the size of the following vehicle in the display image is gradually increased before the display state of the rear-view display unit is switched from the display showing state to the mirror-surface showing state. After the following vehicle is displayed in the same size as the size of the following vehicle that is to reflect in the mirror surface, the display state of the rear-view display unit is switched from the display showing state to the mirror-surface showing state. This processing reduces discomfort caused by change of the size of the following vehicle displayed on the rear-view display unit before and after switching from the display showing state to the mirror-surface showing state.

(7) The image display device according to the above form (6), wherein the controller is configured to, when the vehicle-to-vehicle distance obtained by the distance obtainer is greater than the set value, adjust the image-cutout angle value from the second image-cutout angle value to a third image-cutout angle value such that the size of the following vehicle displayed on the display gradually increases, wherein the third image-cutout angle value is an image-cutout angle value which is less than the second image-cutout angle value and in which the size of the following vehicle displayed in the display showing state is identical to the size of the following vehicle in the mirror-surface showing state at a time point when the display state of the rear-view display unit is switched from the display showing state to the mirror-surface showing state.

In the image display device configured as described above, the image-cutout angle value is gradually adjusted from the second image-cutout angle value to the third image-cutout angle value and thereby gradually reduced without sudden change of the size of the following vehicle displayed on the display. The display state is thereafter switched from the display showing state to the mirror-surface showing state in the state in which the size of the following vehicle displayed in the display showing state is equal to that of the following vehicle displayed in the mirror-surface showing state. This processing reduces discomfort caused at switching of the display state of the rear-view display unit.

(8) The image display device according to the above form (7), wherein the controller is configured to control the display to display a plurality of display images respectively corresponding to a plurality of image-cutout angle values less than the second image-cutout angle value and greater than the third image-cutout angle value, after the display image based on the second image-cutout angle value is displayed on the display and before the display image based on the third image-cutout angle value is displayed on the display.

In the image display device configured as described above, each time when the image-cutout angle value is adjusted little by little from the second image-cutout angle value to the third image-cutout angle value, the controller creates the display images respectively corresponding to the adjusted image-cutout angle values and displays the display images on the display. Thus, the display images are displayed in order from the display image based on the largest image-cutout angle value among the display images respectively corresponding to the image-cutout angle values less than the second image-cutout angle value and greater than the third image-cutout angle value. With this processing, the size of the following vehicle displayed on the display is gradually increased such that the size of the following vehicle on the display image corresponding to the third image-cutout angle value becomes the size of the following vehicle that is to reflect in the mirror surface. In this state, the display state of the rear-view display unit is switched from the display showing state to the mirror-surface showing state. This processing reduces discomfort caused when the display state is switched from the display showing state to the mirror-surface showing state.

(9) The image display device according to any one of the above forms (1) through (8), further comprising a display switcher switchable between a first state and a second state,
   wherein switching of the display switcher from the first state to the second state causes the controller to switch the display state of the rear-view display unit from the mirror-surface showing state to the display showing state, and
   wherein switching of the display switcher from the second state to the first state causes the controller to switch the display state of the rear-view display unit from the display showing state to the mirror-surface showing state.

In the image display device configured as described above, the controller switches the display state of the rear-view display unit in accordance with the state of the display switcher. This configuration enables the display state of the rear-view display unit to be switched by operation of the display switcher by the occupant, for example.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Figure 1:
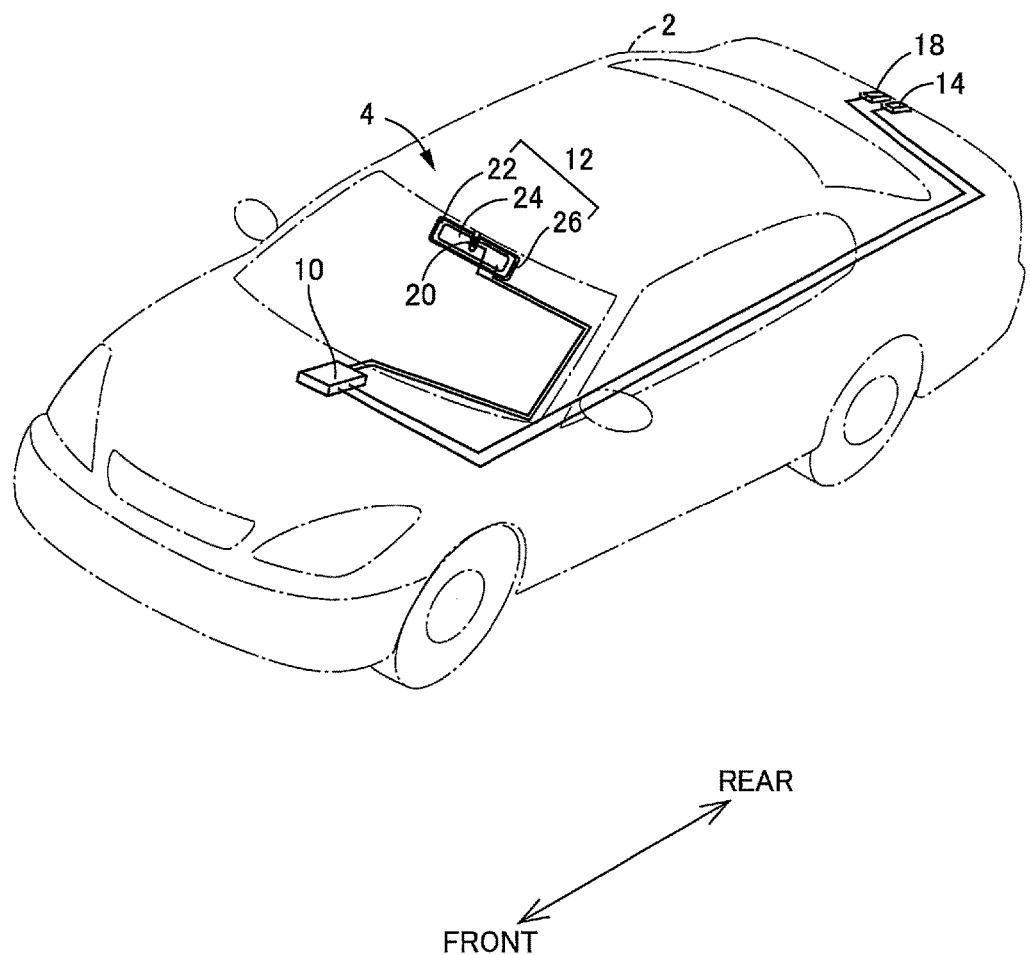
FIG. 1 is a view illustrating an overall construction of a vehicle installed with an image display device according to a first embodiment.
Figure 2:
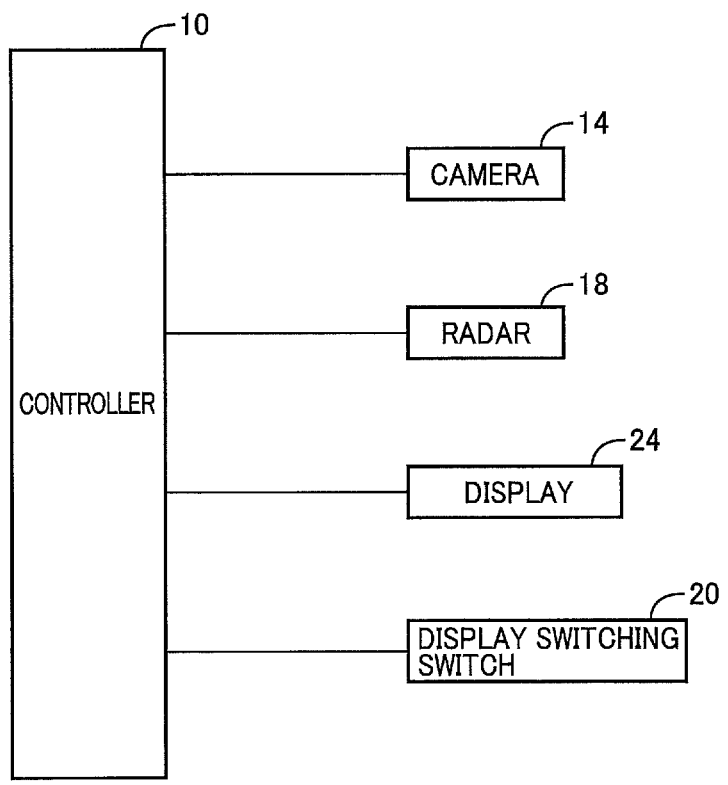
FIG. 2 is a schematic view illustrating electric connection of a controller in the first embodiment.

FIG. 1 is a view of a vehicle 2 installed with an image display device 4 according to a first embodiment. FIG. 2 is a schematic view of an overall construction of the image display device 4 according to the first embodiment. As illustrated in FIG. 1, the image display device 4 mounted on the vehicle 2 includes a controller 10, a rear-side display device 12, a camera 14, a radar 18, and a display switching switch 20. As illustrated in FIG. 1, the front and rear direction is defined with respect to the direction of travel of the vehicle 2.

The controller 10 includes a CPU, a ROM, an EEPROM, a RAM, various ICs, and communication interfaces. The controller 10 executes various controls by controlling the CPU to execute programs stored in the ROM. Devices communicably connected to the controller 10 include the camera 14, the radar 18, the display switching switch 20, and a display 24 which will be described below. The controller 10 cuts out a portion of an image taken by the camera 14, creates a display image, and displays the created display image on the display 24. This image cutout processing for cutting out a portion of the taken image is executed each time when a predetermined length of time is elapsed after the controller 10 has received an ON signal from the display switching switch 20. The image cutout processing will be described later in detail.

The rear-side display device 12 is mounted on a roof portion defining a passenger compartment. The rear-side display device 12 is disposed in front of a driver's seat and between the driver's seat and an assistant-driver's seat. The rear-side display device 12 includes a mirror surface 22, the display 24, and a frame 26. The mirror surface 22 has substantially the same size as the frame 26 and is fitted in the frame 26. The mirror surface 22 reflects a view behind the vehicle 2. The display 24 is formed in a portion of the mirror surface 22. The display 24 is smaller in size than the mirror surface 22 and disposed at substantially the center of the mirror surface (see FIG. 3C). That is, the mirror surface 22 includes: a mirror surface portion 24a formed on a surface of the display 24; and a mirror surface portion 22a located around the display 24. The display 24 displays the display image created by the controller 10.

In a state in which the display 24 is not operated, each of the mirror surface portion 24a and the mirror surface portion 22a serves as an optical mirror (a mirror-surface showing state). In a state in which the display 24 is being operated, the image is displayed on the display 24 and viewable by an occupant (a display showing state). In the case where the mirror surface portion 24a and the mirror surface portion 22a reflect a rear-side view in a state in which the image is displayed on the display 24 in the display showing state, a viewability of the display image displayed on the display 24 is reduced. Thus, the angle of the frame 26 is adjusted in the display showing state such that the mirror surface 22 faces a ceiling of the vehicle 2 so as not to reflect the rear-side view.

The camera 14 is provided on a rear end portion of the roof portion of the vehicle 2 or on a rear end portion of the vehicle 2 to at least take an image in a visible light region. One example of the camera 14 is a CCD camera. The camera 14 takes an image representing a view behind the vehicle 2 and creates image data based on the image. The camera 14 transmits the created image data to the controller 10. The image taken by the camera 14 contains a lane and following vehicles behind the vehicle 2, for example. The radar 18 is disposed on the rear end portion of the vehicle to detect objects near the vehicle. One example of the radar 18 is a millimeter-wave radar configured to radiate millimeter waves to surroundings of the vehicle to detect objects around the vehicle. The radar 18 detects a distance between the detected object and the vehicle and detects a position and a speed of the detected object relative to the vehicle. The radar 18 transmits a signal to the controller 10 in accordance with the detected values. In the present embodiment, the radar 18 detects a distance between the vehicle 2 and the following vehicle located or driving behind the vehicle 2.

The display switching switch 20 is provided at a position at which the rear-side display device 12 and the roof portion of the vehicle 2 are connected to each other. The display switching switch 20 sends the controller 10 a signal for switching a display state (view showing state) of the rear-side display device 12 between the mirror-surface showing state and the display showing state. An ON/OFF state of the display switching switch 20 is switched when the angle of the frame 26 of the rear-side display device 12 is changed by the occupant.

When operated by the occupant, the frame 26 is turned by a turning mechanism provided on the rear-side display device 12. When the frame 26 is held by a holding mechanism provided on the rear-side display device 12 at an angle at which the mirror surface 22 reflects the ceiling of the vehicle 2, a contact of the display switching switch 20 is closed so as to establish an ON state of the display switching switch 20. When the display switching switch 20 is switched to the ON state, the display state of the rear-side display device 12 is switched to the display showing state. In the case where the mirror surface portion 24a and the mirror surface portion 22a reflect a rear-side view in a state in which the image is displayed on the display 24 in the display showing state, a viewability of the display image displayed on the display 24 is reduced. Thus, the angle of the frame 26 is held by the holding mechanism in the display showing state such that the mirror surface 22 does not reflect the rear-side view.

When the frame 26 is turned by the turning mechanism upon operation of the occupant, and held by the holding mechanism at an angle at which the mirror surface 22 reflects a view behind the vehicle 2, the contact of the display switching switch 20 is opened, so that the display switching switch 20 is switched to an OFF state. When the display switching switch 20 is switched to the OFF state, the display state of the rear-side display device 12 is switched from the display showing state to the mirror-surface showing state, so that the mirror surface 22 reflects a view behind the vehicle.

There will be next explained switching of the display state of the rear-side display device 12. Upon detecting that the display switching switch 20 is switched from the OFF state to the ON state, the controller 10 executes a display switch processing for switching the display state from the mirror-surface showing state to the display showing state. Also, upon detecting that the display switching switch 20 is switched from the ON state to the OFF state, and the controller 10 executes a mirror-surface switch processing for switching the display state from the display showing state to the mirror-surface showing state.

Figure 3A:
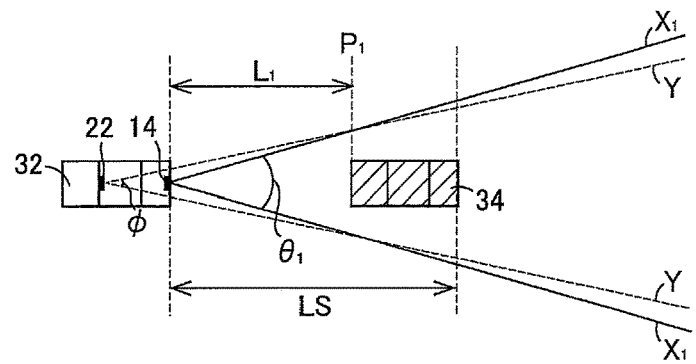
FIG. 3A is a view of an own vehicle and a following vehicle when viewed from above.
Figure 3B:
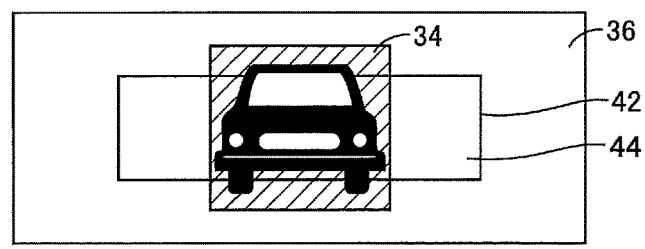
FIG. 3B is a view of a taken image when the following vehicle is located at a position $P_1$ in FIG. 3A.
Figure 3C:
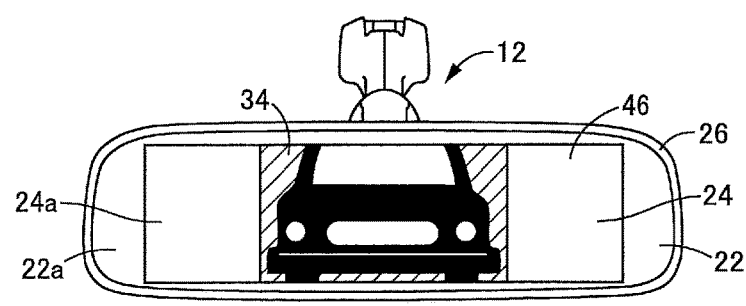
FIG. 3C is a view of a rear-side display device being in a display showing state.
Figure 3D:
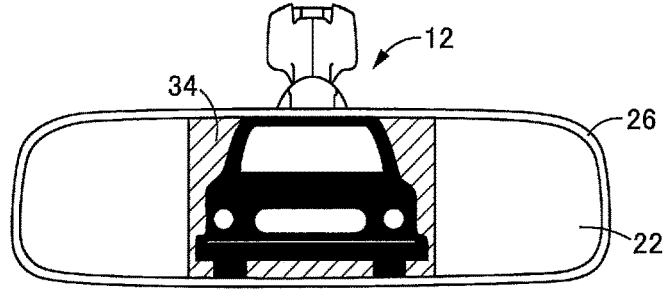
FIG. 3D is a view of the rear-side display device being in a mirror-surface showing state.

There will be next explained the display switch processing executed by the controller 10. First, there will be explained the display switch processing executed in the case where a vehicle-to-vehicle distance between an own vehicle 32 and a following vehicle 34 is less than or equal to a set value LS. FIG. 3A is a view of the own vehicle 32 currently driving and the following vehicle 34 driving behind the own vehicle 32, with the own vehicle 32 and the following vehicle 34 viewed from above. FIG. 3B is a view of an image 36 taken by the camera 14 of the own vehicle 32 when the following vehicle 34 is located at a position $P_1$ illustrated in FIG. 3A. FIG. 3C is a view of the display 24 displaying a display image 46 created from the taken image 36. FIG. 3D is a view of an image that is to reflect in the mirror surface 22 of the own vehicle 32 when the following vehicle 34 is located at the position $P_1$ in FIG. 3A.

In FIG. 3A, boundary lines $X_1$ define a cutout area determined by an image-cutout angle $\theta_1$ of the camera 14 of the own vehicle 32. Boundary lines Y indicated in the broken lines define an optical view area determined by an optical field of view of the mirror surface 22 of the own vehicle 32. The image-cutout angle determines the size of a cutout frame with respect to the image taken by the camera 14, that is, the image-cutout angle determines the size of a cutout image with respect to the taken image. Here, as illustrated in FIGS. 3A and 3B, the image-cutout angle is a value indicating an angle by which the cutout image as a portion of the taken image is cut out from the taken image with respect to the camera 14. A boundary between a portion of the taken image which is to be cut out as the cutout image and a portion of the taken image which is not to be cut out as the cutout image is defined by the boundary lines in FIG. 3A. Thus, the image-cutout angle is represented by an angle between two boundary lines extending from the camera 14. As illustrated in FIGS. 3A and 3B, since the boundary between the portion of the taken image which is to be cut out and the portion of the taken image which is not to be cut out is moved outward by a greater amount with increase in the image-cutout angle, the size of the cutout image with respect to the size of the taken image increases with increase in the image-cutout angle. In this increase, the size of the cutout frame increases with a constant aspect ratio. This aspect ratio is the same as that of the display 24.

The optical field of view indicates a portion of the view behind the vehicle 2, which portion reflects in the mirror surface 22, and an optical viewing angle φ is represented by the angle between the two boundary lines Y extending from the mirror surface 22. Each of the boundary lines Y indicates a boundary between a portion of the view behind the vehicle 2 which reflects in the mirror surface 22 and a portion of the view behind the vehicle 2 which does not reflect in the mirror surface 22 when an occupant of the own vehicle 32 views the mirror surface 22. That is, an object existing on an area between the two boundary lines $X_1$ is contained in a cutout image 44, and an object existing on an area between the two boundary lines Y reflects in the mirror surface 22 (see FIG. 3D). In the following description, the following vehicle 34 located at the position $P_1$ may be referred to as "following vehicle 34 ($P_1$)", and a distance between the own vehicle 32 and the following vehicle 34 ($P_1$) may be referred to as "vehicle-to-vehicle distance $L_1$".

There will be explained the display switch processing executed when the display state of the rear-side display device 12 is switched from the mirror-surface showing state to the display showing state (when the display is activated). As illustrated in FIG. 3A, the camera 14 is provided on the own vehicle 32 behind the rear-side display device 12. In the case where the image-cutout angle $\theta_1$ is greater than the optical viewing angle φ, the boundary lines $X_1$ and the boundary lines Y intersect each other at a position located behind the own vehicle 32 by the vehicle-to-vehicle distance Lt. At this position, the size of the optical view area and the size of the cutout area corresponding to the image-cutout angle $\theta_1$ are equal to each other. Moreover, the size of the display 24 is substantially equal to that of the mirror surface 22. Thus, the size of the following vehicle located at the position $P_1$ with respect to the cutout area is equal to that of the following vehicle with respect to the optical view area. A display image with the size of the display region of the display 24 is created based on a cutout image cut out based on a cutout frame 42 determined by the image-cutout angle $\theta_1$, and the created display image is displayed on the display 24. Accordingly, the size of the following vehicle 34 displayed on the display 24 and the size of the following vehicle 34 that is to reflect in the mirror surface 22 are made equal to each other by setting the image-cutout angle to the image-cutout angle $\theta_1$ that causes the boundary lines $X_1$ and the boundary lines Y to intersect each other at the position located at the vehicle-to-vehicle distance $L_1$ from the following vehicle 34. The size of the following vehicle 34 that is to reflect in the mirror surface 22 is a size of the following vehicle 34 in the mirror surface 22 in the case where the following vehicle 34 reflects in the mirror surface 22.

Before switching the display state of the rear-side display device 12 from the mirror-surface showing state to the display showing state, the controller 10 determines the image-cutout angle based on the vehicle-to-vehicle distance L between the own vehicle 32 and the following vehicle 34 and cuts out the cutout image from the taken image based on the cutout frame having the size corresponding to the determined image-cutout angle. The controller 10 then creates the display image based on the cutout image and displays the created display image on the display 24. In the creation of the cutout image, the controller 10 determines the image-cutout angle such that the size of the following vehicle 34 ($P_1$) displayed on the display 24 is equal to that of the following vehicle 34 ($P_1$) reflecting in the mirror surface 22. The image-cutout angle at which the size of the following vehicle 34 ($P_1$) displayed on the display 24 is equal to that of the following vehicle 34 ($P_1$) reflecting in the mirror surface 22 is determined by the size of the vehicle-to-vehicle distance L between the own vehicle 32 and the following vehicle 34.

The controller 10 executes the display switch processing when the display switching switch 20 is switched from the OFF state to the ON state. When the display switching switch 20 is in the ON state, the camera 14 takes an image and outputs the taken image to the controller 10 each time when a specific length of time is elapsed. When the following vehicle 34 is located at the position $P_1$ illustrated in FIG. 3A, the controller 10 obtains the taken image 36 illustrated in FIG. 3B. The controller 10 then calculates the vehicle-to-vehicle distance $L_1$ between the own vehicle 32 and the following vehicle 34 ($P_1$) based on a value detected by the radar 18. The controller 10 calculates the image-cutout angle $\theta_1$ from the vehicle-to-vehicle distance $L_1$ by using a correlation between (i) a distance between the vehicle and an object (hereinafter referred to as "spaced distance") and (ii) a value of the image-cutout angle.

The correlation between the spaced distance and the image-cutout angle is preliminarily stored in the ROM of the controller 10 before shipment of the vehicle. There will be explained a method of calculating the correlation between the spaced distance and the image-cutout angle. First, an object is placed at a position spaced apart from the vehicle 2 at a predetermined distance. The camera 14 takes an image of this object. The controller 10 cuts out cutout images while changing the image-cutout angle, and measures the image-cutout angle at which the size of the object displayed on the display 24 is equal to the size of the object reflecting in the mirror surface 22. Based on this measurement, the image-cutout angle at the time point when the spaced distance between the vehicle 2 and the object is equal to the predetermined distance is obtained. Likewise, the controller 10 changes the spaced distance to various distances and obtains the image-cutout angles respectively corresponding thereto, whereby the correlation between the spaced distance and the image-cutout angle at the time point when the size of the object displayed on the display 24 is equal to that of the following vehicle reflecting in the mirror surface 22 can be obtained.

The image-cutout angle may be calculated using the vehicle-to-vehicle distance between the own vehicle 32 and the following vehicle 34, the distance between the camera 14 and the mirror surface 22, and a value of the optical viewing angle as illustrated in FIG. 3A. As illustrated in FIG. 3A, since the distance between the camera 14 and the mirror surface 22 and the size of the optical viewing angle φ of the mirror surface 22 are determined in advance, obtaining the vehicle-to-vehicle distance between the own vehicle 32 and the following vehicle 34 enables the controller 10 to calculate the image-cutout angle. Even in the case where the image-cutout angle is calculated, the correlation between the vehicle-to-vehicle distance (the spaced distance) and the image-cutout angle may be preliminarily obtained by the above-described calculation before shipment of the vehicle 2, and this obtained correlation may be stored in the ROM of the controller 10. The controller 10 may determine the image-cutout angle by the above-described calculation each time when the vehicle-to-vehicle distance between the own vehicle 32 and the following vehicle 34 is obtained.

The controller 10 sets the image-cutout angle to the image-cutout angle $\theta_1$ obtained based on the vehicle-to-vehicle distance $L_1$. In this case, the cutout frame is the cutout frame 42 having the size corresponding to the image-cutout angle $\theta_1$. The controller 10 then cuts out the cutout image 44 from the taken image 36 based on the cutout frame 42. The controller 10 executes a mirror-image processing for the cutout image 44 to create the display image 46 suitable for the size of the display 24. The controller 10 sends the display 24 a signal based on the display image 46 and displays the display image 46 on the display 24 as illustrated in FIG. 3C. With these processings, the following vehicle 34 ($P_1$) is displayed on the display 24 with the same size as that of the following vehicle 34 ($P_1$) that is to reflect in the mirror surface 22 illustrated in FIG. 3D.

After the switching of the display state, the controller 10 determines whether the obtained vehicle-to-vehicle distance $L_1$ is less than or equal to the set value LS. The set value LS is a preset distance for which it is determined that the following vehicle 34 is sufficiently spaced apart from the own vehicle 32, and thus there is no need to grasp a sense of distance between the own vehicle 32 and the following vehicle 34. As illustrated in FIG. 3A, when the vehicle-to-vehicle distance is less than the set value LS, the controller 10 cuts out the cutout image based on the cutout frame corresponding to the image-cutout angle calculated based on the vehicle-to-vehicle distance. The controller 10 creates the display image based on the cutout image and displays the display image on the display 24.

Figure 4A:
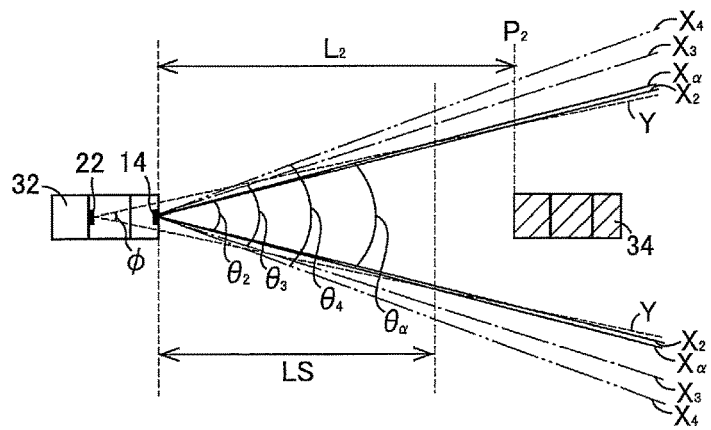
FIG. 4A is a view of the own vehicle and the following vehicle when viewed from above.
Figure 4B:
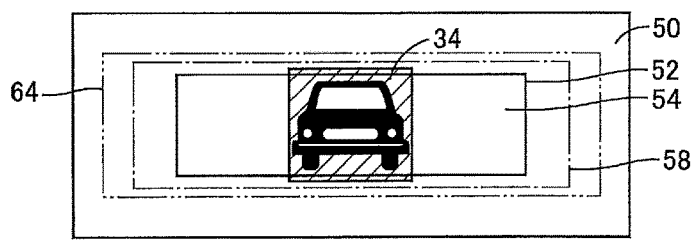
FIG. 4B is a view of a taken image when the following vehicle is located at a position $P_2$ in FIG. 4A.
Figure 4C:
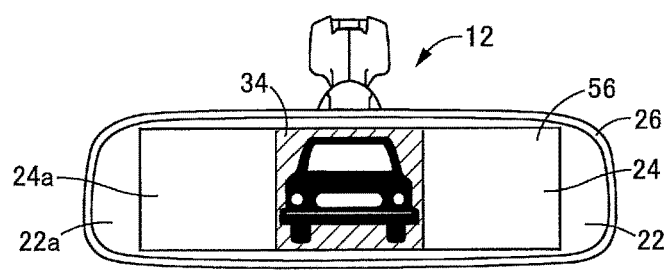
FIG. 4C is a view of the rear-side display device displaying a display image.
Figure 4D:
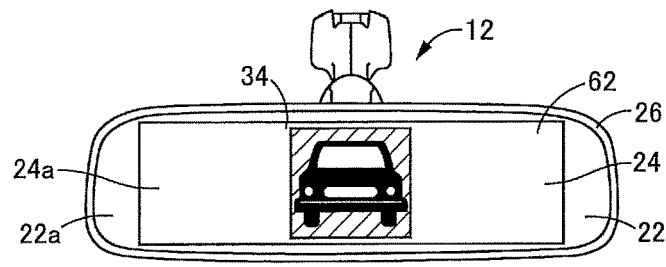
FIG. 4D is a view of the rear-side display device displaying a display image.
Figure 4E:
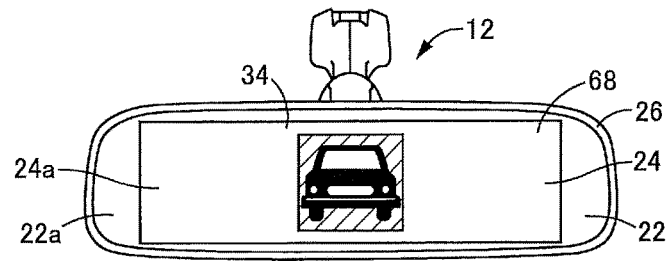
FIG. 4E is a view of the rear-side display device displaying a display image.

There will be explained a case where the vehicle-to-vehicle distance between the own vehicle 32 and the following vehicle 34 is greater than the set value LS. FIG. 4A is a view of the own vehicle 32 currently driving and the following vehicle 34 driving behind the own vehicle 32, with the own vehicle 32 and the following vehicle 34 viewed from above. FIG. 4B is a view of an image 50 taken by the camera 14 of the own vehicle 32 when the following vehicle 34 is located at a position $P_2$ illustrated in FIG. 4A. FIG. 4C is a view of the display 24 on which a display image 56 created from the taken image 50 is displayed. FIG. 4D is a view of the display 24 on which a display image 62 created from the taken image 50 is displayed. FIG. 4E is a view of the display 24 on which a display image 68 created from the taken image 50 is displayed.

In FIG. 4A, boundary lines $X_2$ define a cutout area determined by an image-cutout angle $\theta_2$. Boundary lines $X_\alpha$ define a cutout area determined by an image-cutout angle $\theta_\alpha$ of the camera 14 of the own vehicle 32. Boundary lines $X_3$ indicated by the one-dot chain lines define a cutout area determined by an image-cutout angle $\theta_3$. Boundary lines $X_4$ indicated by the two-dot chain lines define a cutout area determined by a set image-cutout angle $\theta_4$. In the following description, the following vehicle 34 located at the position $P_2$ may be referred to as "following vehicle 34 ($P_2$)", and a distance between the own vehicle 32 and the following vehicle 34 ($P_2$) may be referred to as "vehicle-to-vehicle distance $L_2$". It is noted that the image-cutout angle $\theta_2$ is an angle between the boundary lines $X_2$ when the boundary lines $X_2$ and the boundary lines Y intersect each other at a position located at the vehicle-to-vehicle distance $L_2$ from the own vehicle 32. The image-cutout angle $\theta_2$ is greater than the optical viewing angle φ. The image-cutout angle $\theta_\alpha$ is an angle between the boundary lines $X_\alpha$ when the boundary lines $X_\alpha$ and the boundary lines Y intersect each other at a position located at a distance of the set value LS from the own vehicle 32. The display 24 illustrated in FIG. 4C displays the display image 56 created based on the image-cutout angle $\theta_2$. The display 24 illustrated in FIG. 4D displays the display image 62 cut out based on the image-cutout angle θ₃. The display 24 illustrated in FIG. 4E displays the display image 68 cut out based on the set image-cutout angle θ₄.

The image-cutout angle in the case where the display state of the rear-side display device 12 is switched from the mirror-surface showing state to the display showing state in the state in which the following vehicle 34 is located at the position P₂ is determined in the same manner as in the case where the vehicle-to-vehicle distance is less than or equal to the set value LS. That is, the image-cutout angle is determined to the image-cutout angle θ₂ at which the size of the following vehicle 34 (P₂) displayed on the display 24 and the size of the following vehicle 34 (P₂) reflecting in the mirror surface 22 are equal to each other. After the display state of the rear-side display device 12 is switched from the mirror-surface showing state to the display showing state, and a display image based on the image-cutout angle θ₂ is displayed on the display 24, the controller 10 adjusts the image-cutout angle such that the size of the following vehicle 34 (P₂) displayed on the display 24 gradually decreases. This adjustment will be described later in detail.

The image-cutout angle is increased a plurality of times by a predetermined angle for each increase from the image-cutout angle θ₂ to the set image-cutout angle θ₄. The set image-cutout angle θ₄ is set to be greater than the image-cutout angle θ_α at which the size of the following vehicle 34 displayed on the display 24 is equal to the size of the following vehicle 34 that is to reflect in the mirror surface 22 when the distance between the own vehicle 32 and the following vehicle 34 is equal to the set value LS. The controller 10 determines a plurality of image-cutout angles by increasing the image-cutout angle from the image-cutout angle θ₂ by the predetermined angle for each increase. The controller 10 then cuts out a plurality of cutout images based on a plurality of cutout frames respectively corresponding in size to the determined image-cutout angles. The controller 10 then controls the display 24 to display a plurality of display images created based on the plurality of cutout images cut out by the controller 10.

It is noted that the image-cutout angle θ₃ illustrated in FIG. 4A is one of a plurality of image-cutout angles each greater than the image-cutout angle θ₂ and less than the set image-cutout angle θ₄. The display image 62 (see FIG. 4D) created based on the image-cutout angle θ₃ is one example of one of the plurality of display images. As illustrated in FIG. 4B, the cutout frame when the image-cutout angle is equal to the image-cutout angle θ₃ is the cutout frame 58. Accordingly, the size of the cutout image increases with increase in the image-cutout angle from the image-cutout angle θ₂ to the set image-cutout angle θ₄. A ratio of the size of the following vehicle 34 (P₂) to the size of the cutout image is smaller when the size of the cutout image is large than when the size of the cutout image is small. Since the cutout image is displayed so as to match the size of the display 24, the size of the following vehicle 34 (P₂) displayed on the display 24 is small when the ratio of the size of the following vehicle 34 (P₂) to the size of the cutout image is small. Accordingly, the size of the following vehicle 34 (P₂) displayed on the display 24 decreases with increase in the image-cutout angle from the image-cutout angle θ₂ to the set image-cutout angle θ₄. After the image-cutout angle is increased to the set image-cutout angle θ₄, and a display image 68 created based on a cutout frame 64 corresponding to the set image-cutout angle θ₄ is displayed on the display 24, the image-cutout angle is kept at the set image-cutout angle θ₄ when the vehicle-to-vehicle distance L is greater than the set value LS.

There will be next explained the display switch processing executed when the display state of the rear-side display device 12 is switched from the display showing state to the mirror-surface showing state (when the display 24 is inactivated such that a view behind the vehicle reflects in the mirror surface). The controller 10 executes a mirror-surface switch processing when the display switching switch 20 is switched from the ON state to the OFF state. In the case where the following vehicle 34 is located at the position P₁ at the start of the mirror-surface switch processing, the controller 10 calculates the vehicle-to-vehicle distance L₁ between the own vehicle 32 and the following vehicle 34 (P₁) based on a value detected by the radar 18. Since the vehicle-to-vehicle distance L₁ is less than or equal to the set value LS in this case, the image-cutout angle has been set at the image-cutout angle θ₁, and the display image 46 is displayed on the display 24. At this time, the size of the following vehicle 34 (P₁) displayed on the display 24 is equal to that of the following vehicle 34 (P₁) that is to reflect in the mirror surface 22. Thus, discomfort is not caused even when the display state is switched in the state in which the display image 46 is displayed on the display 24. Accordingly, the controller 10 switches the display state from the display showing state to the mirror-surface showing state.

In the case where the following vehicle 34 is located at the position P₂ at the start of the mirror-surface switch processing, the controller 10 calculates the vehicle-to-vehicle distance L₂ between the own vehicle 32 and the following vehicle 34 (P₂), based on a value detected by the radar 18. Since the vehicle-to-vehicle distance L₂ is greater than the set value LS in this case, the image-cutout angle has been set at the set image-cutout angle θ₄, and the display image 68 is displayed on the display 24. At this time, the size of the following vehicle 34 (P₂) displayed on the display 24 is less than that of the following vehicle 34 (P₂) that is to reflect in the mirror surface 22. Thus, when the display state is switched to the mirror-surface showing state in the state in which the display image 68 is displayed on the display 24, the size of the following vehicle 34 (P₂) displayed on the rear-side display device 12 is greater than that of the following vehicle 34 (P₂) that had been displayed on the display 24, that is, there is a difference in these sizes, leading to discomfort. Accordingly, the controller 10 switches the display state from the display showing state to the mirror-surface showing state after adjusting the image-cutout angle a plurality of times from the set image-cutout angle θ₄ to the image-cutout angle θ₂ by the predetermined angle for each adjustment.

The controller 10 determines a plurality of image-cutout angles by reducing the image-cutout angle from the set image-cutout angle θ₄ each by the predetermined angle for each reduction and cuts out a plurality of cutout images based on a plurality of cutout frames respectively corresponding in size to a plurality of image-cutout angles. The controller 10 then controls the display 24 to display a plurality of display images created based on the plurality of cutout images cut out by the controller 10. The image-cutout angle θ₃ illustrated in FIG. 4A is one of a plurality of image-cutout angles each less than the set image-cutout angle θ₄ and greater than the image-cutout angle θ₂. As illustrated in FIG. 4B, the cutout frame when the image-cutout angle is equal to the image-cutout angle θ₃ is the cutout frame 58. Accordingly, the size of the cutout image decreases with decrease in the image-cutout angle from the set image-cutout angle θ₄ to the image-cutout angle θ₂. The ratio of the size of the following vehicle 34 (P₂) to the size of the cutout image is larger when the size of the cutout image is small than when the size of the cutout image is large.

Since the cutout image is displayed so as to match the size of the display 24, the size of the following vehicle 34 ($P_2$) displayed on the display 24 is large when the ratio of the size of the following vehicle 34 ($P_2$) to the size of the cutout image is large. Accordingly, the size of the following vehicle 34 ($P_2$) displayed on the display 24 increases with decrease in the image-cutout angle from the set image-cutout angle $\theta_4$ to the image-cutout angle $\theta_2$. After the image-cutout angle is reduced to the image-cutout angle $\theta_2$, the controller 10 switches the display state from the display showing state to the mirror-surface showing state in the state in which the display image 56 created based on the image-cutout angle $\theta_2$ is displayed on the display 24. As a result, the size of the following vehicle 34 ($P_2$) displayed on the display 24 is equal to that of the following vehicle 34 ($P_2$) reflecting in the mirror surface 22 at the time of the switching. It is noted that the image-cutout angle at switching is changed to the image-cutout angle $\theta_2$ as illustrated in FIG. 4A when the following vehicle 34 is located at the position $P_2$ in the explanation provided above, but when the following vehicle 34 is located at a position different from the position $P_2$, the image-cutout angle at switching is determined based on the vehicle-to-vehicle distance L between the own vehicle 32 and the following vehicle 34 located at the position.

As described above, the size of the following vehicle 34 to be displayed on the display 24 is made equal to that of the following vehicle 34 reflecting in the mirror surface 22 before the display state of the rear-side display device 12 is switched to the display showing state. When the vehicle-to-vehicle distance L is greater than the set value LS after the display state is switched to the display showing state, the image-cutout angle is gradually increased to the set image-cutout angle $\theta_4$. When the vehicle-to-vehicle distance L is greater than the set value LS before the display state of the rear-side display device 12 is switched to the mirror-surface showing state, the image-cutout angle is gradually reduced to the image-cutout angle at which the size of the following vehicle 34 displayed on the display 24 is equal to that of the following vehicle 34 that is to reflect in the mirror surface 22. The controller 10 switches the display state to the mirror-surface showing state after the display 24 displays a display image based on the reduced image-cutout angle.

Figure 5:
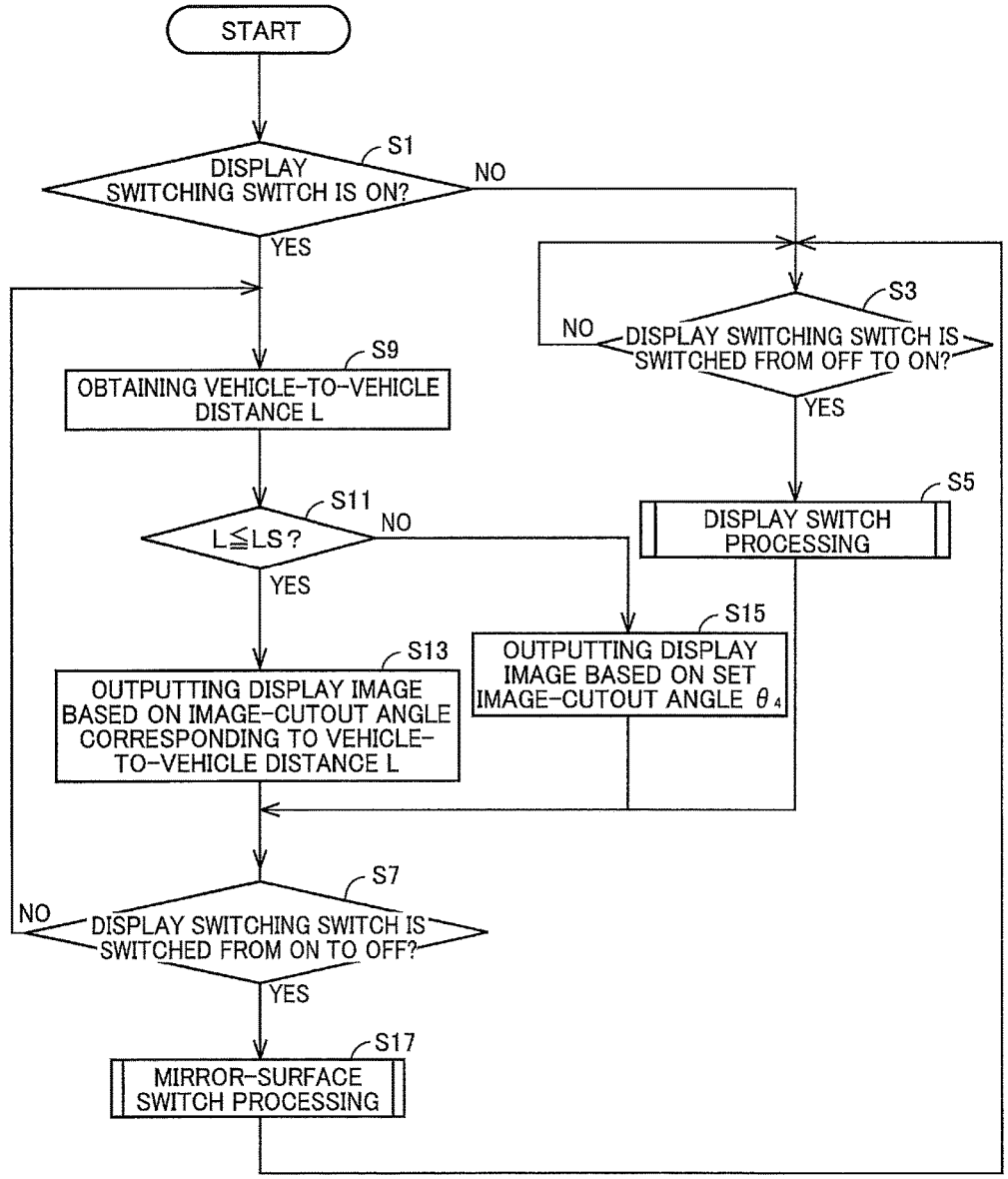
FIG. 5 is a flow chart illustrating processings executed by a controller.

There will be next explained, with reference to the flow charts, processings executed by the controller 10 for switching the display state of the rear-side display device 12. FIG. 5 is a flow chart illustrating the processings for switching the display state. This flow begins when a state of an ignition switch of the vehicle 2 is switched from the OFF state to the ON state. At S1, the controller 10 determines whether the display switching switch 20 is in the ON state. When the display switching switch 20 is in the ON state, this flow goes to S9. When the display switching switch 20 is in the OFF state, this flow goes to S3. It is noted that this explanation is continued assuming that the display state of the rear-side display device 12 is the mirror-surface showing state, that is, the display 24 is in the OFF state.

Figure 7:
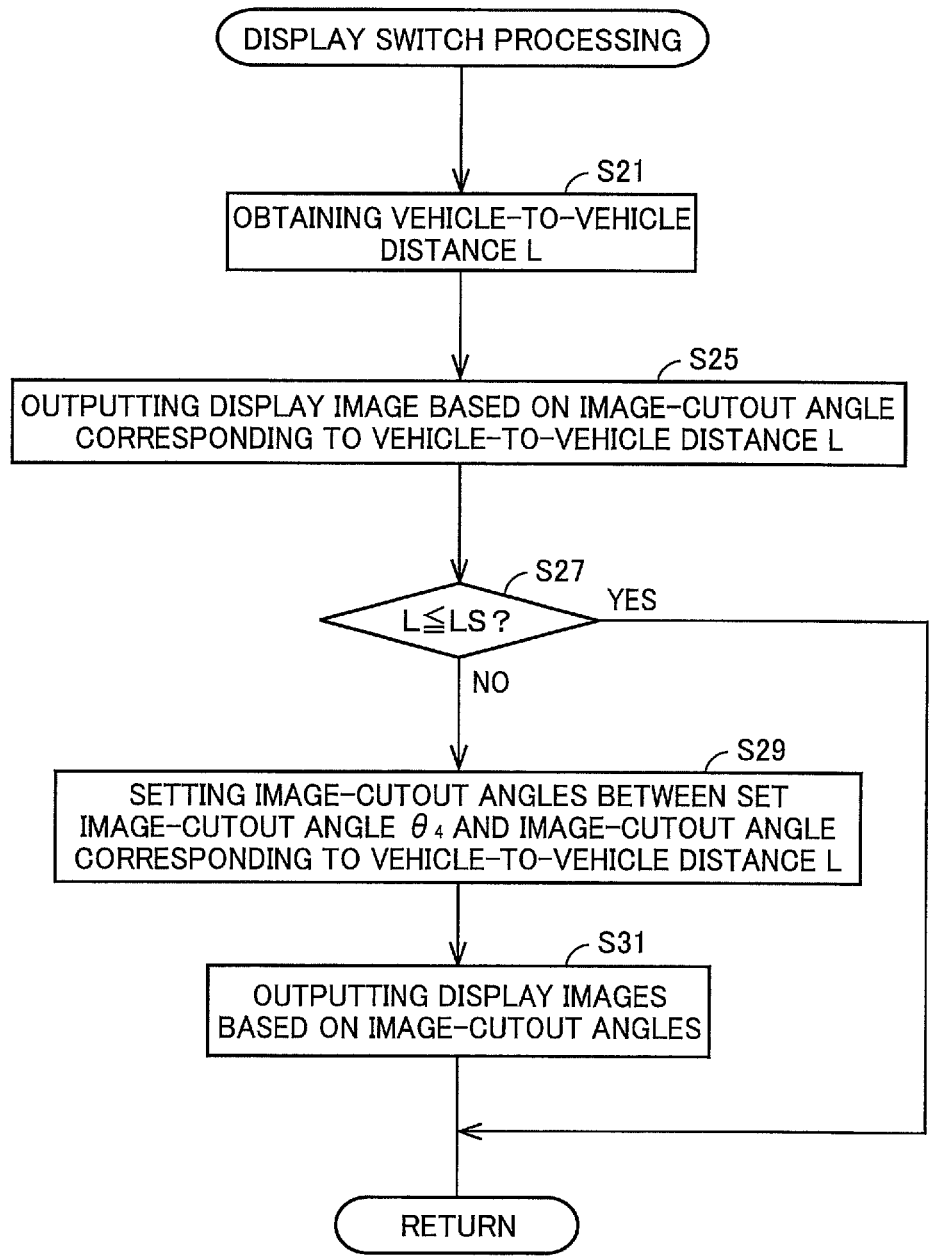
FIG. 7 is a flow chart illustrating a display switch processing executed by the controller.

The controller 10 at S3 determines whether the display switching switch 20 is switched from the OFF state to the ON state. When the display switching switch 20 is switched to the ON state, this flow goes to S5. When the display switching switch 20 remains in the OFF state, the processing at S3 is repeated. Since the display switching switch 20 is switched to the ON state by the occupant having instructed switching of the rear-side display device 12 to the display showing state, the controller 10 at S5 executes the display switch processing to switch the display state of the rear-side display device 12 from the mirror-surface showing state to the display showing state. Here, the display switch processing will be explained. FIG. 7 is a flow chart illustrating the display switch processing executed by the controller 10. The controller 10 at S21 calculates the vehicle-to-vehicle distance L between the own vehicle 32 and the following vehicle 34 based on the value detected by the radar 18. The controller 10 at S25 creates a display image from the cutout image based on the image-cutout angle corresponding to the vehicle-to-vehicle distance L and sends the display 24 a signal relating to the created cutout image. As a result, the display state of the rear-side display device 12 is switched from the mirror-surface showing state to the display showing state.

Figure 6:
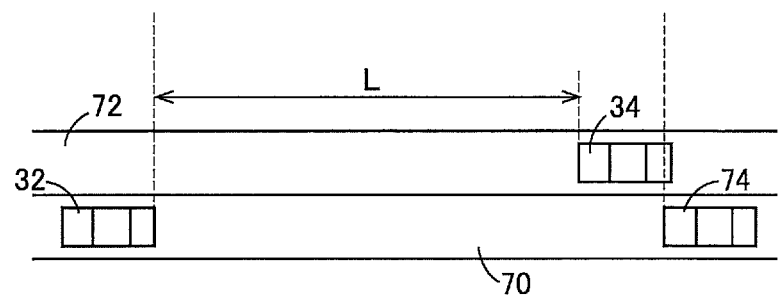
FIG. 6 is a view of the own vehicle and following vehicles driving behind the own vehicle, with the own vehicle and the following vehicles viewed from above.

The controller 10 at S27 determines whether the vehicle-to-vehicle distance L calculated at S21 is less than or equal to the set value LS. When the vehicle-to-vehicle distance L is less than or equal to the set value LS, this flow goes to S7 in FIG. 5. When the vehicle-to-vehicle distance L is greater than the set value LS, this flow goes to S7 after execution of processings at S29 and S31. Here, there will be explained detection of the following vehicle and calculation of the vehicle-to-vehicle distance. FIG. 6 is a view of the own vehicle 32 driving on a lane 70 and a plurality of following vehicles driving behind the own vehicle 32, with the own vehicle 32 and the following vehicles viewed from above. As illustrated in FIG. 6, the following vehicle 34 is driving on a lane 72 next to the lane 70. A following vehicle 74 is driving on the lane 70. In this case, the vehicle-to-vehicle distance L between the own vehicle 32 and the following vehicle 34 in the front and rear direction (the longitudinal direction) of the own vehicle 32 is less than the vehicle-to-vehicle distance between the own vehicle 32 and the following vehicle 74. Accordingly, the controller 10 employs a value of the vehicle-to-vehicle distance L between the own vehicle 32 and the following vehicle 34, for image processing.

The controller 10 at S29 sets a plurality of image-cutout angles created by increasing the image-cutout angle by the predetermined angle for each increase to the set image-cutout angle $\theta_4$ from the image-cutout angle corresponding to the vehicle-to-vehicle distance L. The controller 10 at S31 creates a plurality of display images from a plurality of cutout images based on the image-cutout angles set at S29. The controller 10 then sends the display 24 signals relating to the created display images and controls the display 24 to display the created display images in order from the display image based on the smallest image-cutout angle. With this processing, the image-cutout angle is gradually increased, so that the size of the following vehicle 34 displayed on the display 24 is gradually reduced. After all the created display images are displayed on the display 24, the controller 10 executes a processing at S7 in FIG. 5.

After the completion of the display switch processing at S5, the controller 10 at S7 determines whether the display switching switch 20 is switched from the ON state to the OFF state. When the display switching switch 20 is in the OFF state, this flow goes to S17. When the display switching switch 20 remains in the ON state, this flow goes to S9. When the controller 10 at S7 determines that the display switching switch 20 remains in the ON state, this flow goes to S9. The controller 10 at S9 obtains the vehicle-to-vehicle distance L based on the value detected by the radar 18.

The controller 10 at S11 determines whether the vehicle-to-vehicle distance L obtained at S9 is less than or equal to the set value LS. When the vehicle-to-vehicle distance L is less than or equal to the set value LS, this flow goes to S13. When the vehicle-to-vehicle distance L is greater than the set value LS, this flow goes to S15. The controller 10 at S13 cuts out the cutout image based on the image-cutout angle corresponding to the vehicle-to-vehicle distance L obtained at S9 and creates, based on the cutout image cut out by the controller 10, the display image having a size matching the size of the display 24. The controller 10 then sends the display 24 a signal relating to the created display image and displays the display image on the display 24. After the completion of the processing at S13, the controller 10 executes the processing at S7. When a negative decision (NO) is made at S11, this flow goes to S15. The controller 10 at S15 cuts out the cutout image based on the set image-cutout angle $\theta_4$ and creates the display image based on the cutout image cut out by the controller 10. The controller 10 then sends the display 24 a signal relating to the created display image and displays the display image on the display 24. After the completion at S15, the controller 10 executes the processing at S7.

Figure 8:
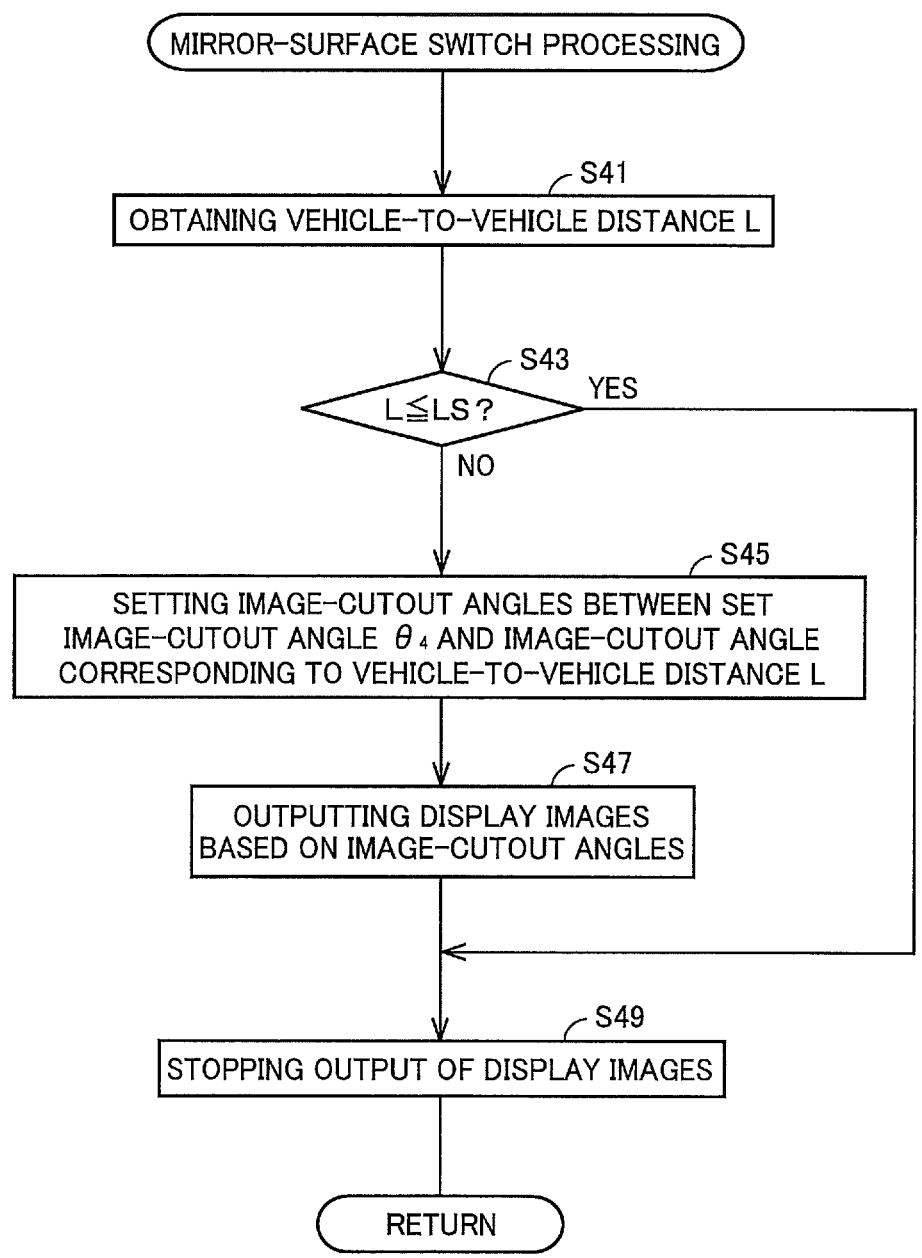
FIG. 8 is a flow chart illustrating a mirror-surface switch processing executed by the controller.

When the controller 10 at S7 determines that the display switching switch 20 is switched from the ON state to the OFF state, this flow goes to S17. Since the display switching switch 20 is switched to the OFF state by the occupant having instructed switching of the rear-side display device 12 to the mirror-surface showing state, the controller 10 at S17 executes the mirror-surface switch processing to switch the display state of the rear-side display device 12 from the display showing state to the mirror-surface showing state. Here, the mirror-surface switch processing will be explained. FIG. 8 is a flow chart illustrating the mirror-surface switch processing executed by the controller 10. The controller 10 at S41 obtains the vehicle-to-vehicle distance L between the following vehicle 34 and the own vehicle 32, based on a value detected by the radar 18. The controller 10 at S43 determines whether the vehicle-to-vehicle distance L obtained at 541 is less than or equal to the set value LS. When the vehicle-to-vehicle distance L is less than or equal to the set value LS, this flow goes to S49. When the vehicle-to-vehicle distance L is greater than the set value LS, this flow goes to S45.

The controller 10 at S45 sets a plurality of image-cutout angles created by reducing the image-cutout angle by the predetermined angle for each reduction between the set image-cutout angle $\theta_4$ and the image-cutout angle corresponding to the vehicle-to-vehicle distance L. The controller at S47 creates a plurality of display images respectively corresponding to a plurality of cutout images based on the image-cutout angles set at S45. The controller 10 then outputs signals relating to the created display images to the display 24 and controls the display 24 to display the created display images in order from the display image based on the largest image-cutout angle. With this processing, the image-cutout angle is gradually reduced, so that the size of the following vehicle 34 displayed on the display 24 is gradually increased. After all the created display images are displayed on the display 24, the controller 10 executes a processing at S49. The controller 10 at S49 stops the output of the signals relating to the display images to the display 24. As a result, the display state of the rear-side display device 12 is switched from the display showing state to the mirror-surface showing state in the state in which the size of the following vehicle 34 displayed on the display 24 is equal to that of the following vehicle 34 that is to reflect in the mirror surface 22. After the completion at S49, the controller 10 executes the processing at S3 in FIG. 5.

In the present embodiment as described above, when the display state of the rear-side display device 12 is switched from the mirror-surface showing state to the display showing state, the controller 10 controls the display 24 to display the display image based on the image-cutout angle $\theta_2$ that is an image-cutout angle at which the display 24 displays the following vehicle 34 ($P_2$) having the same size as that of the following vehicle 34 ($P_2$) that is to reflect in the mirror surface 22, for example. Thus, when the display state of the rear-side display device 12 is switched from the mirror-surface showing state to the display showing state, it is possible to reduce discomfort caused by change of the size of the following vehicle 34 ($P_2$) displayed on the rear-side display device 12 before and after the switching. When the controller 10 determines that the vehicle-to-vehicle distance L is greater than the set value LS, the controller 10 sets the plurality of image-cutout angles between the image-cutout angle $\theta_2$ and the set image-cutout angle $\theta_4$ and controls the display 24 to display the plurality of display images respectively corresponding to the image-cutout angles. With this processing, the following vehicle 34 ($P_2$) displayed on the display 24 is gradually reduced. Accordingly, no discomfort is caused at switching of the display state. Moreover, after the image-cutout angle is increased to the set image-cutout angle $\theta_4$, it is possible to obtain a view broader than that at the time point when the display state is switched. Also, since the following vehicle 34 ($P_2$) displayed on the display 24 is gradually reduced, it is easier for the occupant to recognize the increase in angle of the display image displayed on the display 24.

Since the mirror surface portion 24a is formed in the surface of the display 24, only one of the display showing state and the mirror-surface showing state is established in the rear-side display device 12. In the present embodiment, when the display state is switched between the display showing state and the mirror-surface showing state in the state in which the following vehicle 34 is located at the position $P_2$, the image-cutout angle is adjusted such that the size of the following vehicle 34 ($P_2$) displayed in the display showing state and the size of the following vehicle 34 ($P_2$) displayed in the mirror-surface showing state are equal to each other. This adjustment reduces discomfort at switching of the display state of the rear-side display device 12.

The size of the following vehicle 34 displayed on the display 24 is determined by the value of the image-cutout angle. The size of the following vehicle 34 displayed on the display 24 decreases with increase in the image-cutout angle. In the present embodiment, after the display state is switched from the mirror-surface showing state to the display showing state, when the vehicle-to-vehicle distance L is greater than the set value LS, the image-cutout angle value is gradually increased from the image-cutout angle $\theta_2$ to the set image-cutout angle $\theta_4$. With this processing, the size of the following vehicle 34 displayed on the display 24 gradually decreases. As a result, after the image-cutout angle is increased to the set image-cutout angle $\theta_4$, it is possible to obtain a view broader than that at the time point when the display state is switched. Furthermore, when the vehicle-to-vehicle distance L is greater than the set value LS at switching to the mirror-surface showing state, the controller 10 adjusts the image-cutout angle little by little to the set image-cutout angle $\theta_4$ and creates the display image based on the adjusted image-cutout angle upon each adjustment. The controller 10 controls the display 24 such that the display images corresponding to the respective image-cutout angles between the set image-cutout angle $\theta_4$ and the image-cutout angle $\theta_2$ are displayed in order from the display image corresponding to the largest image-cutout angle. This control gradually increases the size of the following vehicle 34 ($P_2$) displayed on the display 24. Accordingly, it is easy for the occupant to recognize the increase in the angle for the display image displayed on the display when compared with the case where the size of the following vehicle 34 ($P_2$) displayed on the display 24 is instantly changed from its size established when the image-cutout angle is the set image-cutout angle $\theta_4$, to its size established when the image-cutout angle is the image-cutout angle $\theta_2$.

In the present embodiment, when the vehicle-to-vehicle distance L is less than or equal to the set value LS before the display state is switched, the image-cutout angle is determined such that the size of the following vehicle 34 displayed on the display 24 is equal to that of the following vehicle 34 that is to reflect in the mirror surface 22. This processing reduces discomfort at switching of the display state when the vehicle-to-vehicle distance between the own vehicle 32 and the following vehicle 34 is short in such a degree that requires accurate recognition. Also, before the display state is switched from the display showing state to the mirror-surface showing state, the image-cutout angle is gradually reduced from the set image-cutout angle $\theta_4$ to the image-cutout angle $\theta_2$, and the display image corresponding to the image-cutout angle $\theta_2$ is displayed. That is, the display state is switched after the following vehicle 34 ($P_2$) is displayed on the display 24 in the same size as that of the following vehicle 34 ($P_2$) that is to reflect in the mirror surface 22. This processing reduces discomfort caused by change of the size of the following vehicle 34 displayed on the rear-side display device 12 before and after switching of the display state from the display showing state to the mirror-surface showing state.

In the case where the display state is switched from the display showing state to the mirror-surface showing state, when the vehicle-to-vehicle distance L is greater than the set value LS, the controller 10 controls the display 24 to display the display image based on the adjusted image-cutout angle, each time when the image-cutout angle is reduced from the set image-cutout angle $\theta_4$ by the predetermined angle. This control gradually increases the size of the following vehicle 34 ($P_2$) displayed on the display 24 without sudden change until the size of the following vehicle 34 ($P_2$) displayed on the display 24 becomes equal to the size of the following vehicle 34 ($P_2$) that is to reflect in the mirror surface 22. The display state is thereafter switched in the state in which the size of the following vehicle 34 ($P_2$) displayed on the display 24 is equal to that of the following vehicle 34 ($P_2$) that is to reflect in the mirror surface 22. This processing reduces discomfort caused by change of the size of the following vehicle 34 ($P_2$) displayed on the rear-side display device 12 before and after the switching.

Furthermore, in the case where the vehicle-to-vehicle distance L is greater than the set value LS in the mirror-surface switch processing, each time when the image-cutout angle is adjusted from the set image-cutout angle $\theta_4$ to the image-cutout angle $\theta_2$ by the predetermined angle for each adjustment, the controller 10 creates the display image based on the adjusted image-cutout angle and displays the created display image on the display 24. Thus, the controller 10 controls the display 24 to display the display images in order from the display image based on the largest image-cutout angle among the display images based on the image-cutout angles less than the set image-cutout angle $\theta_4$ and greater than the image-cutout angle $\theta_2$. With this processing, the size of the following vehicle 34 displayed on the display 24 is gradually increased until the size of the following vehicle 34 displayed on the display 24 becomes equal to the size of the following vehicle 34 that is to reflect in the mirror surface 22. The display state is thereafter switched in a state in which the size of the following vehicle 34 ($P_2$) displayed on the display 24 is equal to the size of the following vehicle 34 ($P_2$) that is to reflect in the mirror surface 22. This processing reduces discomfort caused by change of the size of the following vehicle 34 ($P_2$) displayed on the rear-side display device 12 before and after the switching.

In the present embodiment, the angle of the rear-side display device 12 is operated to operate the display switching switch 20. This configuration enables the display state of the rear-side display device 12 to be switched in response to operation of the occupant.

In the first embodiment, the taken image 36 is one example of a rear-view image. The radar 18 is one example of a distance obtainer. The image-cutout angle is one example of an image-cutout angle value. The set value LS is one example of a set value. The mirror surface portion 24*a* is one example of a first mirror surface portion. The mirror surface portion 22*a* is one example of a second mirror surface portion. The image-cutout angle $\theta_2$ is one example of a first image-cutout angle value. The image-cutout angle $\theta_2$ is one example of a third image-cutout angle value. The set image-cutout angle $\theta_4$ is one example of a second image-cutout angle value. The display switching switch 20 is one example of a display switcher. The ON state of the display switching switch 20 is one example of a first state. The OFF state of the display switching switch 20 is one example of a second state.

While the embodiment has been described above, it is to be understood that the disclosure is not limited to the details of the illustrated embodiment, but may be embodied with various changes and modifications, which may occur to those skilled in the art, without departing from the spirit and scope of the disclosure. In the first embodiment, the vehicle-to-vehicle distance between the own vehicle and the following vehicle is obtained based on the value detected by the radar 18, but the present disclosure is not limited to this configuration. For example, the vehicle-to-vehicle distance between the own vehicle and the following vehicle may be obtained via communication between these vehicles. In the first embodiment, the controller 10 sets the set value LS, and when the vehicle-to-vehicle distance is greater than the set value LS, the image cutout processing is executed based on the set image-cutout angle $\theta_4$, but the present disclosure is not limited to this configuration. For example, the controller 10 may determine the value of the image-cutout angle to an appropriate value based on the vehicle-to-vehicle distance in each of all the vehicle-to-vehicle distances without setting the set value LS.

What is claimed is:

1. An image display device, comprising:
a camera configured to take an image representing a view behind a vehicle;
a rear-view display unit comprising (i) a mirror surface reflecting a view behind the vehicle and (ii) a display configured to display at least a portion of a rear-view image taken by the camera, wherein a display state of the rear-view display unit is switchable between a mirror-surface showing state in which the view behind the vehicle reflects in the mirror surface and a display showing state in which the view behind the vehicle is displayed on the display; and
a controller configured to:
cut out a cutout image from the rear-view image based on an image-cutout angle value, wherein the cutout image is a portion of the rear-view image taken by the camera, and the image-cutout angle value represents a size of the cutout image with respect to the rear-view image;

create a display image based on the cutout image cut out by the controller such that the display image matches a size of a display region of the display; and display the created display image on the display, wherein the image display device further comprises a distance obtainer configured to obtain a vehicle-to-vehicle distance between the vehicle and a following vehicle that follows the vehicle, wherein the controller is configured to:

determine a magnitude of the image-cutout angle value based on the vehicle-to-vehicle distance obtained by the distance obtainer, such that the display state of the rear-view display unit is to be switched from the mirror-surface showing state to the display showing state such that a size of the following vehicle in the mirror-surface showing state is identical to a size of the following vehicle to be displayed in the display showing state;

control the display to display the display image created from the cutout image that is cut out in the determined image-cutout angle value; and adjust the image-cutout angle value so as to gradually decrease a size of the following vehicle displayed on the display when the vehicle-to-vehicle distance obtained by the distance obtainer is greater than a set value.

2. The image display device according to claim 1, wherein the display is formed on the mirror surface, wherein the mirror surface comprises: a first mirror surface portion formed on a surface of the display; and a second mirror surface portion disposed around the first mirror surface portion, and wherein the rear-view display unit is switchable between (i) the mirror-surface showing state in which the view behind the vehicle reflects in the first mirror surface portion and the second mirror surface portion and (ii) the display showing state in which the view behind the vehicle is displayed on the display.

3. The image display device according to claim 1, wherein the controller is configured to, when the vehicle-to-vehicle distance obtained by the distance obtainer is greater than the set value, adjust the image-cutout angle value from a first image-cutout angle value to a second image-cutout angle value greater than the first image-cutout angle value such that the size of the following vehicle displayed on the display gradually decreases, wherein the first image-cutout angle value is a value in which the size of the following vehicle in the mirror-surface showing state is identical to the size of the following vehicle displayed in the display showing state at a time point when the display state is switched from the mirror-surface showing state to the display showing state.

4. The image display device according to claim 3, wherein the controller is configured to control the display to display a plurality of display images respectively corresponding to a plurality of image-cutout angle values greater than the first image-cutout angle value and less than the second image-cutout angle value, after the display image based on the first image-cutout angle value is displayed on the display and before the display image based on the second image-cutout angle value is displayed on the display.

5. The image display device according to claim 1, wherein the controller is configured to, when the vehicle-to-vehicle distance obtained by the distance obtainer is less than or equal to the set value, determine the image-cutout angle value such that the size of the following vehicle displayed on the display is identical to a size of the following vehicle that is spaced apart from the vehicle at the obtained vehicle-to-vehicle distance and that is to reflect in the mirror surface.

6. The image display device according to claim 1, wherein the controller is configured to, when the display state of the rear-view display unit is switched from the display showing state to the mirror-surface showing state and when the vehicle-to-vehicle distance obtained by the distance obtainer is greater than the set value, adjust the image-cutout angle value such that the size of the following vehicle in the display image gradually increases and such that the display state of the rear-view display unit is switched from the display showing state to the mirror-surface showing state in a state in which the size of the following vehicle displayed in the display showing state is identical to the size of the following vehicle in the mirror-surface showing state.

7. The image display device according to claim 6, wherein the controller is configured to, when the vehicle-to-vehicle distance obtained by the distance obtainer is greater than the set value, adjust the image-cutout angle value from the second image-cutout angle value to a third image-cutout angle value such that the size of the following vehicle displayed on the display gradually increases, wherein the third image-cutout angle value is an image-cutout angle value which is less than the second image-cutout angle value and in which the size of the following vehicle displayed in the display showing state is identical to the size of the following vehicle in the mirror-surface showing state at a time point when the display state of the rear-view display unit is switched from the display showing state to the mirror-surface showing state.

8. The image display device according to claim 7, wherein the controller is configured to control the display to display a plurality of display images respectively corresponding to a plurality of image-cutout angle values less than the second image-cutout angle value and greater than the third image-cutout angle value, after the display image based on the second image-cutout angle value is displayed on the display and before the display image based on the third image-cutout angle value is displayed on the display.

9. The image display device according to claim 1, further comprising a display switcher switchable between a first state and a second state, wherein switching of the display switcher from the first state to the second state causes the controller to switch the display state of the rear-view display unit from the mirror-surface showing state to the display showing state, and wherein switching of the display switcher from the second state to the first state causes the controller to switch the display state of the rear-view display unit from the display showing state to the mirror-surface showing state.

* * * * *